United States Patent [19]
Günther et al.

[11] Patent Number: 5,602,840
[45] Date of Patent: Feb. 11, 1997

[54] PROGRAM-CONTROLLED ISDN SWITCHING SYSTEM WITH A PROGRAM MODULE CONSTRUCTED IN ACCORDANCE WITH THE PRINCIPLES OF OBJECT-ORIENTED PROGRAMMING FOR THE HANDLING OF SWITCHED CONNECTIONS

[75] Inventors: Wolfgang Günther, München; Gerhard Mägerl, Pliening, both of Germany

[73] Assignee: Siemens Aktiengesellschaft, Munich, Germany

[21] Appl. No.: 307,753
[22] PCT Filed: Mar. 15, 1993
[86] PCT No.: PCT/DE93/00233
  § 371 Date: Sep. 26, 1994
  § 102(e) Date: Sep. 26, 1994
[87] PCT Pub. No.: WO93/20509
  PCT Pub. Date: Oct. 14, 1993

[30] Foreign Application Priority Data

Mar. 27, 1992 [DE] Germany .......................... 42 10 137.9

[51] Int. Cl.$^6$ ........................................ H04J 3/02
[52] U.S. Cl. ........................................ 370/385
[58] Field of Search ........................ 370/58.1, 58.2, 370/68.1, 110.1, 112, 94.1; 379/10, 11; 340/825.22, 825.79, 825.83, 825.84

[56] References Cited

U.S. PATENT DOCUMENTS 5,291,479  3/1994  Vaziri et al. .......................... 370/110.1

FOREIGN PATENT DOCUMENTS 0405829  2/1991  European Pat. Off. ..
0445769  11/1991  European Pat. Off. ..

OTHER PUBLICATIONS

"Siemens" switching system EWSD, are described in a special issue Dienstintegrierendes Digitalnetz ISDN (Integrated Services Digital Network ISDN), Telcom Report 8, 1985, Siemens AG, pp. 15–21.
Meyer, B.: "Object–oriented Software Construction", Prentice–Hall, Englewood Cliffs, New York, 1988, or from Fraunheim, B. et al.: "Objektorientierte Programmierung" (C++–Programmierkurs, Part 1 ... Part 4, Elektronik 1990, Issues 22 ... 25).

Primary Examiner—Benedict V. Safourek
Assistant Examiner—Ricky Ngo
Attorney, Agent, or Firm—Hill, Steadman & Simpson

[57] ABSTRACT

In an ISDN switching system, a program module is set up in accordance with the principles of object-oriented programming for the handling of switched connections. The protocol modules used in protocol architectures (for example CCITT recommendations) for the standardization of functional switching procedures are represented as object-oriented structural elements. During the implementation of the system program module in the switching system, objects are instantiated for connections and/or for calls and/or for signaling operations. A copy of the data area belonging to the structural element concerned is in each case set up in the data store as a kind of pattern. The data individual to the connection or call or signaling are entered into this pattern. The data areas remain in existence only for the duration of the connection or the call or the signaling operation concerned.

2 Claims, 2 Drawing Sheets

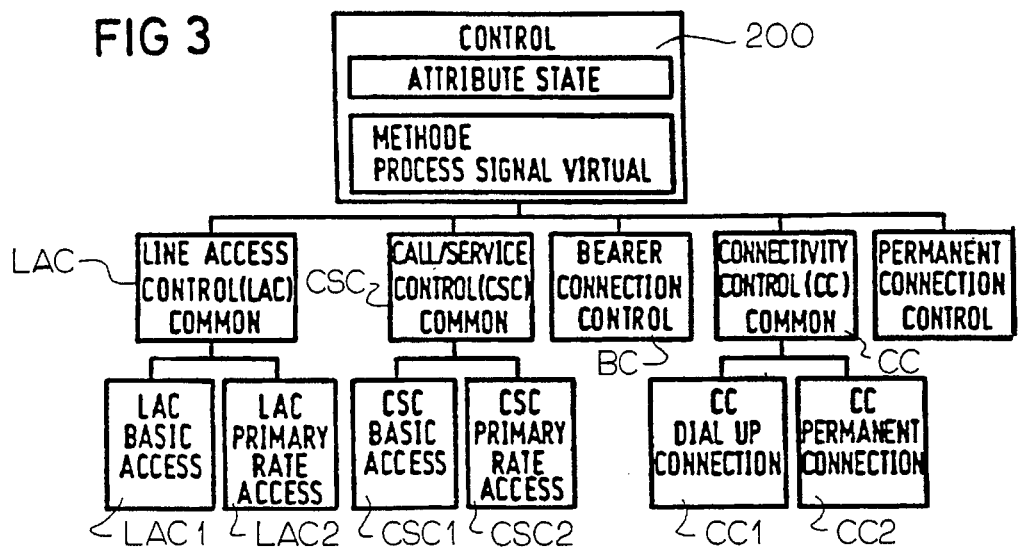
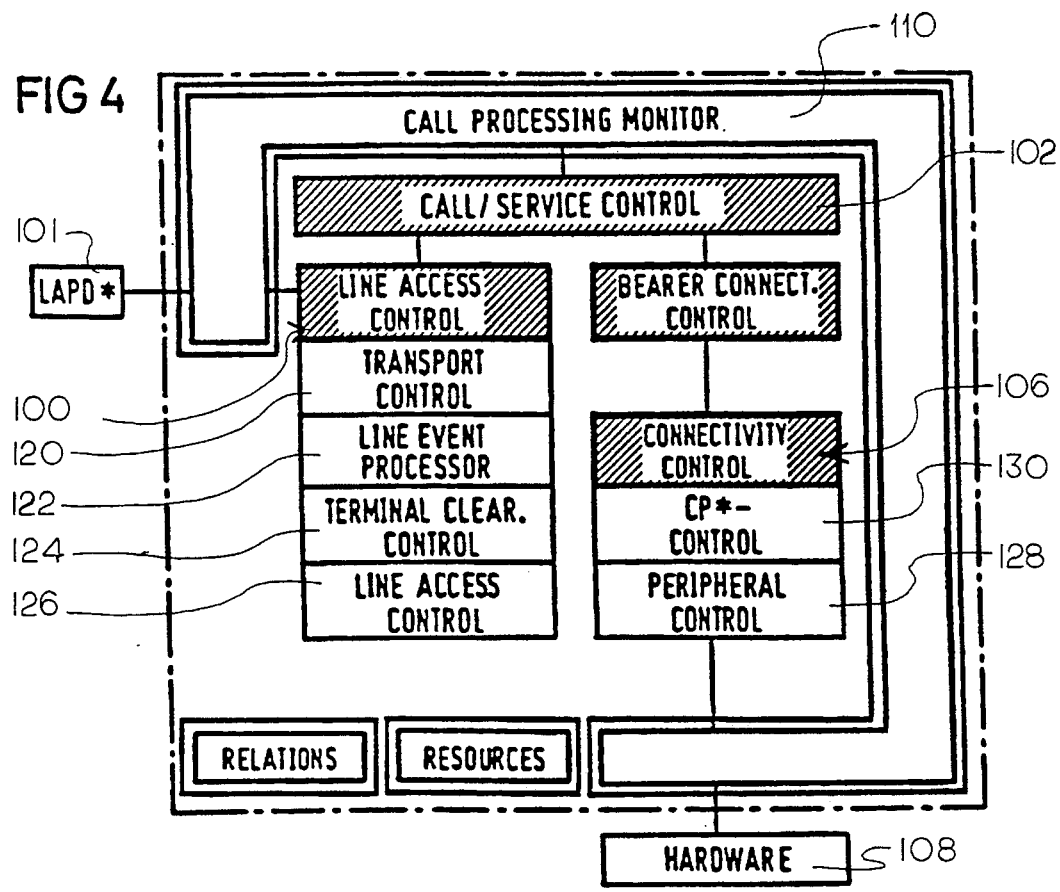

PROGRAM-CONTROLLED ISDN SWITCHING SYSTEM WITH A PROGRAM MODULE CONSTRUCTED IN ACCORDANCE WITH THE PRINCIPLES OF OBJECT-ORIENTED PROGRAMMING FOR THE HANDLING OF SWITCHED CONNECTIONS

BACKGROUND OF THE INVENTION

Known ISDN communication systems comprise clearly defined functional modules with standardized interfaces. A functional division over various control computers achieves the effect that an adaptation to different tasks and the introduction of new functional and service features does not affect the system structure.

The essential aspects of such a communication system, the "Siemens" switching system "EWSD", are described in a special issue "Dienstintegrierendes Digitalnetz ISDN" (Integrated Services Digital Network ISDN), Telcom Report 8, 1985, Siemens AG.

Both the hardware structure and the software structure of the switching system are broken down according to modular principles. The software, that is the programming component of the switching system, can be subdivided into the system program modules—operating system, call processing, signal transfer control, data protection and administration and maintenance.

While operating system functions are application-independent, the signal transfer control is an ISDN-specific subsystem. The system program module of the call processing provides the actual services for the user interface of the terminals or for the interfaces with the various networks.

European reference EP-A-0 405 829 discloses a telephone switching system which is implemented by means of independent software components, referred to as objects. The objects communicate with one another only by messages and symbolic names. A first object, which wishes to communicate with another object, informs the system existing at run time of an executable expression, known as a message. The message contains a symbolic name and the method name for the target object. Static and dynamic objects are provided, static objects defining the configuration of the exchange and being independent of temporary activities within the exchange. Dynamic objects are set up for a certain time, for example for the duration of a call. In this case, objects are created by the system existing at run time on the basis of an established component class as a pattern for how the particular component (instance) is to be constructed. The class includes a definition of the instance of data elements which are managed by the respective component, and also a definition of the set of methods (program text) which have sole access to the instance data. Dynamic objects are created for a specific purpose (for example for a telephone call) and destroyed when there is no longer any need for them.

In the area of the call processing system program module, still expected standardization activities make it particularly important to be able to carry out amendments and additions without great effort and at the same time to meet the real-time requirements demanded of the system.

SUMMARY OF THE INVENTION

The object of the present invention is to structure for an ISDN switching system at least the program module for the call processing in such a way that amendments and additions can be implemented in functional procedures with as little effort as possible and troubleshooting in the switching system is simplified.

This object is achieved according to the invention by an ISDN switching system with a system program module constructed in accordance with the principles of object-oriented programming for the handling of switched connections. The protocol modules used in protocol architectures for the standardization of functional switching procedures are represented as object-oriented structural elements which represent classes in the sense of object-oriented programming and of which objects are instantiated for connections and/or for calls and/or for signaling operations. A copy of the data area belonging to the structural element concerned is in each case set up in the data store as a kind of pattern, in which data individual to the connection or call or signaling are entered and which remains in existence only for the duration of a connection concerned or a call concerned or a signaling operation concerned.

Programming for call processing is performed in accordance with the principles of object-oriented programming. More detailed information on object-oriented programming and its principles can be taken, for example, from Meyer, B.: "Object-oriented Software Construction", Prentice-Hall, Englewood Cliffs, N.Y. 1988, or from Fraunheim, B. et al.: "Objektorientierte Programmierung" (C ++-Programmierkurs, Part 1 . . . Part 4, Elektronik 1990, Issues 22 . . . 25).

Unlike in the case of the conventional procedural method, in which there are two mutually separate structural elements, namely data which represent some information or other and program procedures during the execution of which the data are manipulated and used for information processing, in an object-oriented system there exist only structural elements which comprise a unit of data and program procedures (methods), and to the outside present a closed structure. Such a structure is generally referred to as an object.

According to the invention, the functional protocol units used in protocol architectures for standardization are regarded as object-oriented structural elements, i.e. as classes. By the mapping of functional protocol units onto object-oriented structural elements (classes), it can be ensured that the switching procedures prescribed in the standardization are maintained in the switching system and, in the case of amendments of the protocol units due to future standardization measures, only the class concerned has to be amended with regard to its function, As soon as a request from a subscriber is reported to the call processing, which is intended to effect a connection set-up, a call and/or a signaling operation, an object is in each case instantiated, i.e. a copy is made, by the structural elements (classes) concerned with the request, and is placed in the store. The instantiated objects comprise only the data areas of the underlying object-oriented structural elements. These data areas serve to a certain extent as a pattern for storing connection data created in conjunction with the request by the user causing the instantiation. These data areas remain in existence only for the duration of the request concerned.

On account of the fact that only the underlying class, i.e. its program, can access the data area of a class or an object instantiated from the class, it is ensured that the connection data entered into a data area cannot be overwritten by other program modules or classes. This aspect simplifies maintenance, in particular troubleshooting, since a data area with connection data is created for every request by a user, and in the case of erroneous connection data they can only have been created by the underlying structural element (class).

An advantageous further development of the invention is that protocol modules are in each case represented by a plurality of structural elements on which common program sequences and data are combined in a hierarchically higher-level structural element.

On account of the inheritance relationships possible due to the object-oriented programming, subclasses can be formed for special applications, their common procedures or attributes continuing to be placed in the object-oriented structural element, then referred to as an upper class. The subclasses of course inherit the program code of the upper class. The advantage of this breakdown into subclasses is a reduction in the program code and less effort in the functional test. By use of inheritance mechanisms and instantiation, the required program code is kept small. Development times are shortened and the execution of the programmed function is speeded up.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

FIG. 3 shows a representation of the hierarchy of application classes, and FIG. 4 shows a protocol architecture according to FIG. 2 with subclasses.

DESCRIPTION OF THE PREFERRED EMBODIMENT

Figure 1:
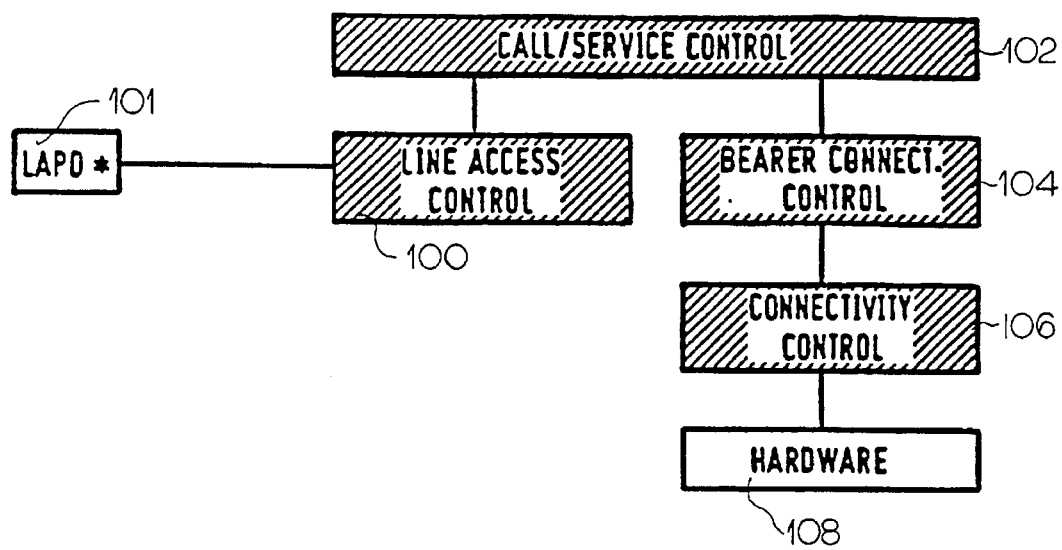
FIG. 1 shows a CCITT protocol architecture according to recommendations Q.931 and Q.764.

For a better understanding of the exemplary embodiment, first of all some fundamental relationships are to be looked at more closely.

The call processing software, which in a program-controlled switching system is afforded the main function, must meet the standardization requirements of the CCITT recommendations for subscriber signaling (DSS1) and for network signaling (ISUP).

When programming in accordance with the principles of object-oriented programming, the so-called "class" is the most important structural element. A "class" is understood as both a manageable element during the translation and for the program configuration and as an implementation of an abstract data type.

In the object-oriented programming, accordingly it must always be determined first of all what is to be defined as the "class". It has been found that, at the beginning of the development phase, classes are to be subdivided into two groups, i.e. into standard classes and into application classes. The task underlying standard classes is that of excluding the possibility of the same basic data structures being constructed again and again. The standard classes are consequently to be regarded as a development tool of the programmer, just like the programming language itself.

The application classes represent functional units which are denotative of the respective specific field of application. In a switching system, such functional units are, for example, the subscriber, line unit, switching unit or "connection control".

Standard classes can be used in a multiplicity of different software complexes. They represent generalizations, from which application classes can be derived. Two types of standard classes are specified:

"Generic standard classes" are patterns for classes. They allow constants and data types to be established as "generic parameters". By allocating real values to these parameters, generic instances, that is again classes, can be formed. By the use of "generic classes", the basic data structures can be formulated and adapted to the specific requirement of an application. Examples of "generic standard classes" are "table", "index table", "1—1 relation", "list". An example of a generic instance of "list" is the list of all references to all connections which run through a line.

"Virtual standard classes" are used to specify standard interfaces for application classes. In object-oriented programming, the information can be exchanged between classes only by calling up a method which is defined in a class. Therefore, the specification of the interfaces with respect to the classes includes the definition of all factors which are important for the caller of the methods, for example the "method name", the "parameters" or the "parameter types". In an application class, the definition of the interface is usually completed with the executable program code of the methods. This program code is not visible, however, to the caller of the class.

In a "virtual standard class", the methods are "virtual", i.e. the interfaces of the methods are defined but the methods themselves are not implemented. Application classes can be derived from a "virtual standard class" by means of the inheritance concept (for example by formation of a subclass). This means that the interface of the "virtual standard class" (seen as an upper class) is inherited in its entirety by the subclass.

Since the "virtual standard class" does not contain the executable code of the methods, this has to be instigated by the subclass.

Examples of "virtual standard classes" in the switching software are "timer event receiver", "external event receiver" or "control". The "control" class offers the "process signal" method, which is consequently offered automatically by all the subclasses of "control" to the "call processing control units". The meaning of the application classes is looked at below.

In FIG. 1 a protocol architecture with protocol modules is represented. The hatched protocol modules represent the functional protocol units derived from the CCITT recommendations and of significance for the structuring of the call processing software. To be specific, these protocol units have the following functions:

"Q.931 protocol handling", module 100, is responsible for protocol handling on the subscriber LAPD 101, as is specified in CCITT recommendations Q.930/931 for the "protocol control". In this case, "Q.931 protocol handling" assumes only the states which are required for the basic tasks of connection set-up and clearing, but not for facility-related tasks.

"Call/service control" module 102, in the following abbreviated to CSC, includes call handling. For this purpose, CSC has access to the subscriber data and checks authorizations. CSC instigates the setting-up and clearing of connections, and also charge registration. CSC is the link between the signaling on the subscriber side and the signaling on the network side.

"Bearer connection control", in the following abbreviated to BCC, executes the "link-by-link" procedures of the "ISUP", as are specified in the "call processing control" module of CCITT recommendation Q.764. These signaling procedures are used in Stage 1 of the B-ISDN only for system-internal signaling between the A side and the B side.

Connectivity control module 106", in the following abbreviated to CC, controls the setting-up and clearing of connections within the switching system, i.e. CC carries out the communication with the call processing peripherals of the LTGE and with the CP* and issues setting instructions to the switching hardware 108. CC conceals the hardware structure of the switching system from other application classes of the GPE call processing.

When converting into an object-oriented software structure, only in the first approach is each of these protocol modules assigned at least one class. The classes thus produced are not yet executable as they stand and are also not optimized in the sense of object-oriented programming. To achieve this, additional classes are inserted.

Figure 2:
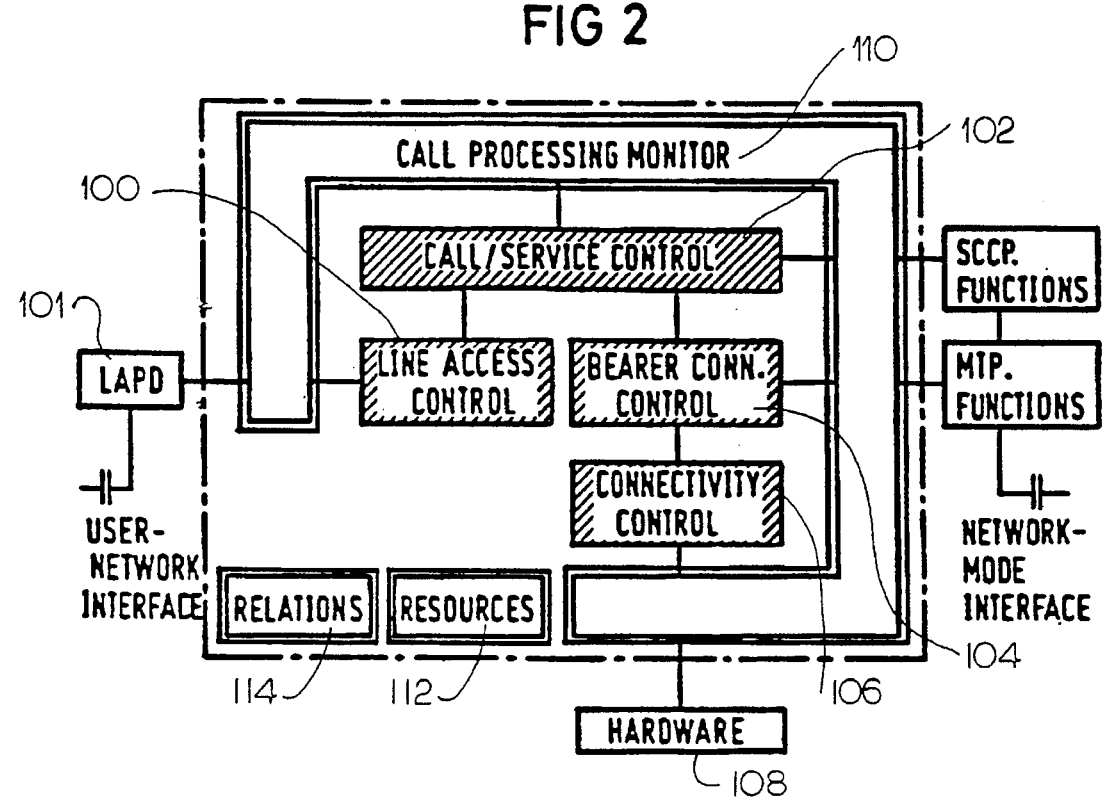
FIG. 2 shows a protocol architecture according to FIG. 1 with classes additionally provided in the sequence.

In FIG. 2 the additionally inserted classes are depicted as double-bordered blocks. The following serve as additional classes a "call processing monitor module 110", which sends the incoming stimulating pulses to the correct entity. This distributing function must exist, because external communication partners, such as for example terminals or peripheral control computers, do not know the object structure of the call processing software.

Classes which represent physically or logically existing "resources" 112 of the switching system, and classes which describe "relations" 114 between external and internal variables or only between internal variables, for example various reference managers for the conversion of logical references to physical references and vice versa.

The inheritance hierarchy of the classes in the switching software is represented in FIG. 3. In the formation of the class hierarchy, common factors in the application classes are sought and these common factors are combined in superclasses. When doing so, it must be ensured that all the switching control units, in particular the classes LAC, CSC, CC and BC, can be reached via a standard interface 200. Therefore, the virtual standard class "control" was implemented as a superclass for all the control units. With the inheritance concept, all the instantiated objects of the subclass "control" can be addressed as though they were themselves instantiated objects of "control". This relationship is referred to as polymorphism. For the classes LAC, CSC and CC there are set up a plurality of variants, i.e. subclasses. LAC and CSC have in each case a "basic access" variant (LAC1, CSC1) and a "primary rate access" variant- (LAC2, CSC2). CC has a "dial-up connection" variant CC1 and a "permanent connection" variant CC2. Since the variants of a class usually have a common program code and data, these are removed from the variants and transferred into a newly created superclass. The originally created classes then contain only sequences and data which are specific to the respective variant. Some of the protocol modules derived from the protocol architecture can be broken down further, i.e. mapped onto a plurality of classes.

In FIG. 4 it is shown how the protocol modules "line access control" 100 and "connectivity control" 106 are broken down further, i.e. mapped onto a plurality of classes. The protocol module "line access control" is then represented by the following classes:

"transport control 120", which manages the utilization of the layer 2 connections by the layer 3, "line event processor 122", which assumes the processing of events which concern all or a certain selection of calls of a layer 2 connection, "terminal clearing control 124", which handles the protocol for reading out the terminals on the B side not taken into consideration in allocation of a call, and "line access control 126", which handles the remaining functions of the Q.931 protocol.

The protocol module "connectivity control" is represented by the following two classes:

"peripheral control 128", which carries out the communication with the call processing peripherals of the system, and "CP* control 130", which carries out the communication with the call processing in the virtual processor CP*.

As already mentioned in conjunction with FIG. 3, possibilities for inheritance relationships are determined and utilized, i.e. subclasses for specific applications are formed and their common procedures or attributes are placed in an upper class.

The protocol module "call/service control" is represented, for example, by two classes, of which a first has a subclass for call handling of an ATM subscriber and a subclass for call handing of an ATM private branch exchange. The common features in the call handling of ATM subscriber and ATM private branch exchange are contained in the first class.

Of the second classes provided for representation of the protocol module "call/service control", there exists precisely one static object, which is involved in the setting-up of a call on the B side. This static object carries out the call number assessment, to be able to decide whether a subscriber with the B call number in question exists. If such a subscriber exists, this static object instantiates the matching subclass, that is either the one for call handling of an ATM subscriber or the one for call handing of an ATM private branch exchange. If no such subscriber exists, the static object terminates the call. This achieves on the one hand the effect that the separation between the two subclasses is retained and on the other hand the effect that the "bearer connect control" is not burdened with information on the type of subscriber line. Furthermore, is it provided that the static object must additionally deal with the case where it cannot be decided on the B side from the available incomplete call number of the B side whether or not there is a subscriber line with this call number.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A system program module for use in an ISDN switching system, the system program module constructed in accordance with object-oriented programming for handling switched connections, said system program module comprising:

object-oriented structural elements which are classes in object-oriented programming and of which objects are instantiatable for at least one of a connection and a call, and a signalling operation and which represent protocol modules used in protocol architectures for standardization of functional switching procedures;

a respective object-oriented structural element implies a data area of which a copy is in each case set up in a data memory area as a pattern for entering data, that is unique to said at least one of a connection and a call and a signalling, and said copy remaining in existence only for a duration of said at least one of a connection and a call and a signaling operation.

2. The system program module as claimed in claim 1, wherein the protocol module is represented by a plurality of structural elements in a hierarchy, common program sequences and data being combined in a hierarchically higher-level structural element of the plurality of structural elements.

* * * * *